(12) United States Patent
Larsén et al.

(10) Patent No.: US 12,722,218 B2
(45) Date of Patent: Sep. 1, 2026

(54) SYSTEM FOR PROTECTING AN OPERATOR OF A POWER TOOL

(71) Applicant: HUSQVARNA AB, Huskvarna (SE)

(72) Inventors: Martin Larsén, Jönköping (SE); Niklas Sarius, Jönköping (SE); Sören Kahl, Mjölby (SE); Per Norén, Nykil (SE)

(73) Assignee: HUSQVARNA AB, Huskvarna (SE)

( * ) Notice: Subject to any disclaimer, the term of this patent is extended or adjusted under 35 U.S.C. 154(b) by 486 days.

(21) Appl. No.: 17/619,680

(22) PCT Filed: Apr. 22, 2021

(86) PCT No.: PCT/SE2021/050371

§ 371 (c)(1),
(2) Date: Dec. 16, 2021

(87) PCT Pub. No.: WO2021/215992

PCT Pub. Date: Oct. 28, 2021

(65) Prior Publication Data

US 2022/0388081 A1 Dec. 8, 2022

(30) Foreign Application Priority Data

Apr. 23, 2020 (SE) .................................... 2050466-8

(51) Int. Cl.
*B23D 59/00* (2006.01)
*B23D 57/02* (2006.01)
*B27B 17/08* (2006.01)

(52) U.S. Cl.
CPC ......... *B23D 59/001* (2013.01); *B23D 57/023* (2013.01); *B27B 17/083* (2013.01)

(58) Field of Classification Search
CPC .. B23D 57/02; B23D 57/023; B23Q 11/0078; B23Q 11/0089; B23Q 17/2428;
(Continued)

(56) References Cited

U.S. PATENT DOCUMENTS 5,942,975 A 8/1999 Soerensen
7,936,094 B2 5/2011 Rossi et al.
(Continued)

FOREIGN PATENT DOCUMENTS

AU 2011289336 B2 4/2015
AU 2015203185 A1 7/2015
(Continued)

OTHER PUBLICATIONS

Search Report and Office Action for Swedish Application No. 2050466-8 mailed Dec. 17, 2020.
(Continued)

*Primary Examiner* — Boyer D Ashley
*Assistant Examiner* — Richard D Crosby, Jr.
(74) *Attorney, Agent, or Firm* — Burr & Forman

(57) ABSTRACT

A system for protecting an operator (110) of a power tool may include a first set of wearable sensors (120) worn by the operator (110), a second set of wearable sensors (130) worn by the operator (110), a first tool sensor (122) disposed at the power tool where the first tool sensor (122) is configured to communicate with the first set of wearable sensors (120), a second tool sensor disposed (132) at the power tool where the second tool sensor (132) is configured to communicate with the second set of wearable sensors (130), and a controller (140). The controller (140) may be configured to determine, based on distances between the first tool sensor (122) and the first set of wearable sensors (120) and between the second tool sensor (132) and the second set of wearable sensors (130), whether to initiate a protective action with respect to the power tool.

20 Claims, 6 Drawing Sheets

(58) Field of Classification Search
CPC . B23Q 17/2433; B23Q 17/2442; F16P 3/008; F16P 3/12; F16P 3/14–148
See application file for complete search history.

(56) References Cited

U.S. PATENT DOCUMENTS

| | | | | |
|---|---|---|---|---|
| 8,316,547 | B2 | 11/2012 | Hecht et al. | |
| 8,479,624 | B2 * | 7/2013 | Flyash | B26B 21/48 83/13 |
| 8,752,301 | B2 * | 6/2014 | George | B27B 17/00 30/381 |
| 8,890,684 | B2 * | 11/2014 | Tkachenko | G01S 11/06 342/51 |
| 9,557,008 | B2 * | 1/2017 | Cappellari | F16P 3/148 |
| 10,736,213 | B2 | 8/2020 | Longinotti-Buitoni et al. | |
| 10,864,651 | B2 | 12/2020 | Gass et al. | |
| 10,865,941 | B2 | 12/2020 | Lewis | |
| 11,135,665 | B2 * | 10/2021 | Martinsson | B23D 59/001 |
| 11,629,818 | B2 * | 4/2023 | Hanf | F16P 3/147 83/62.1 |
| 11,745,381 | B2 * | 9/2023 | Kübeler | B27B 9/02 83/13 |
| 11,829,519 | B1 | 11/2023 | Moschella | |
| 2004/0181951 | A1 | 9/2004 | Wittke | |
| 2007/0085502 | A1 | 4/2007 | Graves | |
| 2010/0064532 | A1 * | 3/2010 | Wittke | B27G 19/003 83/13 |
| 2010/0180740 | A1 * | 7/2010 | Krapf | F16P 3/148 83/72 |
| 2010/0194209 | A1 | 8/2010 | Richter | |
| 2010/0257743 | A1 * | 10/2010 | George | B27G 19/003 83/62.1 |
| 2012/0000682 | A1 | 1/2012 | Grazioli | |
| 2012/0004760 | A1 * | 1/2012 | Bonerz | G05B 19/4061 700/178 |
| 2012/0279285 | A1 * | 11/2012 | Kato | B30B 15/285 73/65.01 |
| 2013/0152752 | A1 | 6/2013 | Cappellari et al. | |
| 2014/0166323 | A1 | 6/2014 | Cooper | |
| 2014/0182138 | A1 * | 7/2014 | Krenik | B26B 19/388 29/428 |
| 2015/0260823 | A1 * | 9/2015 | Hansen | G01S 1/68 342/450 |
| 2016/0146934 | A1 * | 5/2016 | Chawla | G01S 5/021 342/458 |
| 2016/0279752 | A1 | 9/2016 | Zipf et al. | |
| 2016/0310064 | A1 | 10/2016 | Cheng | |
| 2017/0107090 | A1 | 4/2017 | Mondal et al. | |
| 2017/0113316 | A1 * | 4/2017 | Barr | B23Q 17/20 |
| 2017/0173749 | A1 * | 6/2017 | Stock | B23Q 17/0952 |
| 2017/0273374 | A1 * | 9/2017 | Howland | F16P 3/148 |
| 2018/0108241 | A1 * | 4/2018 | Wong | G01P 15/18 |
| 2018/0153444 | A1 | 6/2018 | Yang et al. | |
| 2018/0211345 | A1 * | 7/2018 | Bean | G01S 11/06 |
| 2019/0061159 | A1 | 2/2019 | Domae et al. | |

FOREIGN PATENT DOCUMENTS

| | | | |
|---|---|---|---|
| CA | 2810325 | C | 8/2019 |
| CH | 712468 | A1 | 11/2017 |
| CN | 101287578 | A | 10/2008 |
| CN | 103168192 | A | 6/2013 |
| CN | 105856172 | A | 8/2016 |
| CN | 206085226 | U | 4/2017 |
| CN | 109476033 | A | 3/2019 |
| CN | 106132649 | B | 11/2019 |
| CN | 105637281 | B | 2/2020 |
| CN | 212634532 | U | 3/2021 |
| DE | 10227749 | A1 | 1/2004 |
| DE | 102006002668 | A1 | 7/2007 |
| DE | 102006014819 | A1 | 10/2007 |
| DE | 102018222393 | A1 | 6/2020 |
| DE | 102018251705 | A1 | 7/2020 |
| DE | 102019103778 | A1 | 8/2020 |
| DE | 102019211894 | A1 | 2/2021 |
| EP | 2020275 | A3 | 7/2013 |
| EP | 3296064 | A1 | 3/2018 |
| EP | 3432782 | A1 | 1/2019 |
| EP | 3616860 | A2 | 3/2020 |
| FR | 2712837 | A1 | 6/1995 |
| FR | 2831476 | A1 | 5/2003 |
| FR | 2846729 | B1 | 2/2005 |
| GB | 2587774 | A | 4/2021 |
| JP | 2012148359 | A | 8/2012 |
| KR | 1668693 | B1 | 10/2016 |
| KR | 101713622 | B1 | 3/2017 |
| NZ | 579017 | A | 7/2012 |
| WO | 1996037350 | A1 | 11/1996 |
| WO | 03006213 | A2 | 1/2003 |
| WO | 2005099981 | A1 | 10/2005 |
| WO | 2011117091 | A1 | 9/2011 |
| WO | 2012025458 | A1 | 3/2012 |
| WO | 2012098609 | A1 | 7/2012 |
| WO | 2012177751 | A1 | 12/2012 |
| WO | 2013080233 | A1 | 6/2013 |
| WO | 2015140770 | A2 | 9/2015 |
| WO | 2015169342 | A1 | 11/2015 |
| WO | 2016124415 | A1 | 8/2016 |
| WO | 2017165757 | A1 | 9/2017 |
| WO | 2017197308 | A1 | 11/2017 |
| WO | 2021043558 | A1 | 3/2021 |
| WO | 2021043740 | A1 | 3/2021 |

OTHER PUBLICATIONS

International Search Report and Written Opinion for International Application No. PCT/SE2021/050371 mailed Sep. 6, 2021.

Search Report and Office Action for Swedish Application No. 1950847-2 mailed Jan. 27, 2020.

International Search Report and Written Opinion for International Application No. PCT/SE2020/050679 mailed Oct. 16, 2020.

* cited by examiner

SYSTEM FOR PROTECTING AN OPERATOR OF A POWER TOOL

TECHNICAL FIELD

Example embodiments generally relate to power equipment and, more particularly, relate to a system configured to intelligently protect the user of a chainsaw or other power equipment such as power cutters with blade or chain.

BACKGROUND

Property maintenance tasks are commonly performed using various tools and/or machines that are configured for the performance of corresponding specific tasks. Some of those tools, like chainsaws, are designed to be effective at cutting trees in situations that could be relatively brief, or could take a long time including, in some cases, a full day of work. When operating a chainsaw for a long period of time, fatigue can play a role in safe operation of the device. However, regardless of how long the operator uses the device, it is important that the operator remain vigilant to implementing safe operating procedures in order to avoid injury to himself/herself and to others.

To help improve safety, operators are encouraged to wear protective clothing and other personal protective equipment (PPE). However, some operators may find the PPE to be uncomfortable and, depending on the weather, may work with very thin clothes on their upper bodies. Accordingly, it may be desirable to define additional "intelligent" protection solutions that do not rely on PPE in order to protect users of chainsaws and other outdoor power equipment.

BRIEF SUMMARY OF SOME EXAMPLES

Some example embodiments may provide a system for protecting an operator of a power tool. The system may include a first set of wearable sensors worn by the operator, a second set of wearable sensors worn by the operator, a first tool sensor disposed at the power tool where the first tool sensor is configured to communicate with the first set of wearable sensors, a second tool sensor disposed at the power tool where the second tool sensor is configured to communicate with the second set of wearable sensors, and a controller. The controller may be configured to determine, based on distances between the first tool sensor and the first set of wearable sensors and between the second tool sensor and the second set of wearable sensors, whether to initiate a protective action with respect to the power tool.

In one example embodiment, another system for protecting an operator of a power tool may be provided. The system may include a plurality of distance sensors worn by the operator, a reader disposed at the power tool, and a controller configured to determine, based on distances between each of the distance sensors and the reader, whether to initiate a protective action with respect to the power tool. The controller may be configured to perform an adaptive power control cycle to determine the distances between each of the distance sensors and the reader.

In another example embodiment, yet another system for protecting an operator of a power tool may be provided. The system may include a plurality of inertial measurement unit (IMU)-based sensors worn by the operator, a tool position sensor disposed at the power tool, and a controller. The controller may be configured to determine, based on measurements between the IMU-based sensors and the tool position sensor, whether to initiate a protective action with respect to the power tool. The IMU-based sensors and the tool position sensor may be periodically calibrated based on predefined poses of the operator and corresponding positions of the power tool.

Some example embodiments may improve the user experience, safety, and/or productivity during use of outdoor powered equipment.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

DETAILED DESCRIPTION

Figure 1:
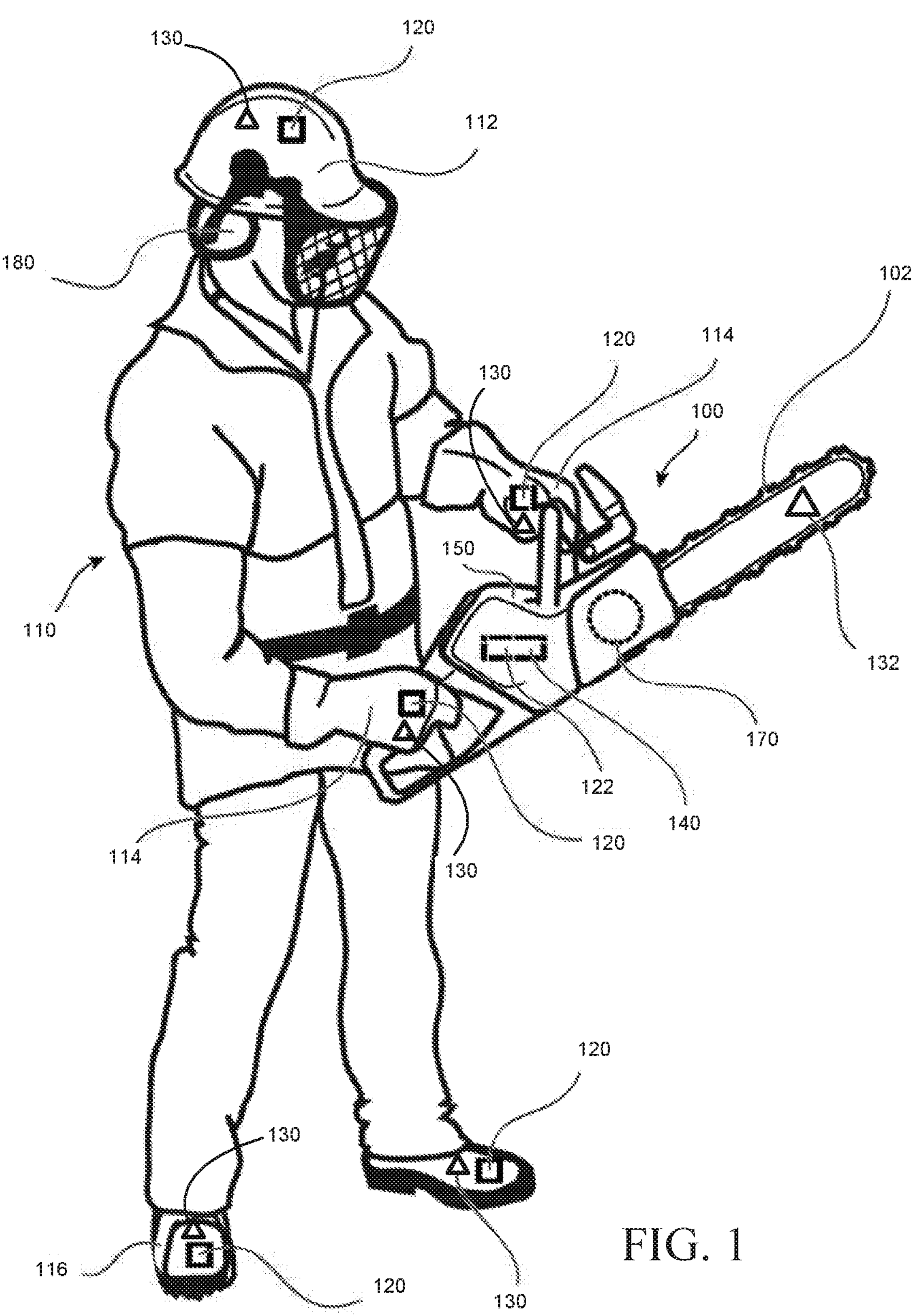
FIG. 1 illustrates a concept diagram of a system in which wearable sensors may operate in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection or interaction of components that are operably coupled to each other.

Some example embodiments may provide for an intelligent protection system that is configured to monitor a position of the guide bar or blade (or other working assembly) of the chainsaw (or other power equipment) relative to body parts of the user. The system is configured to detect when the user's body parts come too close to the guide bar or blade, or otherwise detect when situations arise for which stopping of the chain is desirable. Both the user and the PPE can therefore be protected during operation of various types of cutting equipment.

With respect to the goal discussed above, one solution may be to place inertial measurement unit (IMU) based tracking sensors on the device (e.g., near the guide bar or blade) and on the body parts that are to be protected. IMU based sensors may include three axis accelerometers, gyroscopes and/or magnetometers in order to track movement in three dimensions. This type of tracking is commonly employed in ergonomic and sports research, and is used for special effects in movies and computer games, in order to track body motion. Putting sensors also on or near the guide bar or blade would enable the body motion to be tracked relative to the guide bar or blade, so that protective actions could be prescribed when such tracking indicated a potential intersection between the guide bar or blade and a part of the body. Moreover, volumes could be modeled around each of the body parts and the guide bar or blade in order to define protected volumes (e.g., defined by the body part (or other object) and a predetermined distance around the body part/object) that, when breached, cause protective actions to be implemented.

However, there are known accuracy issues associated with IMU based tracking sensors. In this regard, pure-IMU based displacement calculation solutions (i.e., dead reckoning) introduce calculation errors due to inaccuracy of the sensors, noise, and limitations associated with the calculation platform. Accordingly, some example embodiments may define a system that enables the calibration of IMU-based tracking sensors so that calibrated motion tracking may be enabled. Additionally or alternatively, the IMU-based tracking sensors may be combined with other sensors (e.g., distance measurement sensors) to define a system that employs sensor fusion for improved accuracy with respect to tracking and protective function initiation.

By improving accuracy, and by providing redundancy, a future possibility of defining a system that is both accurate and reliable enough to be operated without PPE can potentially be realized. As such, example embodiments may include the provision of sensor fusion with combinations of different types of sensors and tracking mechanisms. Example embodiments may also include the provision of tracking algorithms and/or methods that employ sensors for measuring distances accurately using adaptive signal strength measurements.

FIG. 1 illustrates an intelligent protection system of an example embodiment being applied where the outdoor power equipment is a chainsaw 100 having an endless chain 102 that rotates about a guide bar to perform cutting operations. As shown in FIG. 1, an operator 110 wears two sets of wearable sensors. In this regard, the operator 110 is wearing a helmet 112, gloves 114, and boots 116 as examples of PPE. The sensors may be integrated into the PPE, or may be attached thereto. Of course, the sensors could alternatively be integrated into or attached to other clothing or gear, and at other locations as well. Thus, the specific examples shown in FIG. 1 should be appreciated as being non-limiting in relation to the numbers of sensors, locations of the sensors, and methods of attaching the sensors to the operator 110 and/or the gear of the operator 110.

In this example, the two sets of wearable sensors include a first set of wearable sensors that are IMU-based sensors 120. The IMU-based sensors 120 of FIG. 1 are disposed on the helmet 112, gloves 114 and boots 116 that the operator 110 is wearing, but could be at other locations as well, as noted above. Thus, for example, additional IMU-based sensors 120 could be provided at the knees, elbows, chest or other desirable locations on the operator 110. The IMU-based sensors 120 may operate in cooperation with a tool position sensor 122, which may be disposed at a portion of the tool (e.g., chainsaw 100). Of note, the tool position sensor 122 may itself be an IMU-based sensor and/or may include a set of such sensors. The IMU-based sensors 120 and the tool position sensor 122 may each be configured to perform motion tracking in three dimensions in order to enable relative positions between body parts at which the IMU-based sensors 120 are located and the tool to be tracked. The motion tracking may be performed in connection with the application of motion tracking algorithms on linear acceleration and angular velocity data in three dimensions.

The two sets of wearable sensors also include a second set of wearable sensors that are distance sensors 130. Although the distance sensors 130 of this example are shown to be in the same locations on the operator 110 that the IMU-based sensors 120 have been placed, such correspondence is not necessary. As such, more or fewer distance sensors 130 could be provided than IMU-based sensors 120, and the distance sensors 130 could be provided at the same or different locations on the operator 110. The distance sensors 130 may be configured to operate in cooperation with a tool distance sensor 132 that may be disposed at a portion of the tool (e.g., chainsaw 100). In this example, the tool distance sensor 132 may be disposed at a guide bar of the chainsaw 100 so that distance measurements made between the tool distance sensor 132 and one or more of the distance sensors 130 are indicative of a distance between the guide bar and the body part on which the corresponding one of the distance sensors 130 is being worn. Of note, the tool distance sensor 132 may be a single sensor and/or may include a set of such sensors.

As can be appreciated from the descriptions above, the IMU-based sensors 120 may be sensors configured to track movement in three dimensions. Meanwhile, the distance sensors 130 may be configured to measure or track distances in either two dimensions or simply in one dimension (i.e., straight line distance). In either case, distances or proximity measurements may be performed so that the chainsaw 100 (or at least the cutting action thereof) may be disabled based on distance or proximity thresholds that can be defined (e.g., for short distances), or based on combinations of relative motion of body parts and the tool at angular velocities or linear velocities above certain thresholds (e.g., stop delay based distances for larger distances).

In an example embodiment, a controller 140 may be disposed at the tool (e.g., chainsaw 100) and, in this case, may be provided within a housing 150 of the chainsaw 100. The controller 140 may be configured to communicate with the tool position sensor 122 and/or the IMU-based sensors 120 to perform motion tracking as described herein. In FIG. 1, the controller 140 and tool position sensor 122 are shown to be collocated. However, such collocation is not necessary. Moreover, the tool position sensor 122 could be located at any desirable location on the chainsaw 100. Thus, for example, the controller 140 may have a wired or wireless connection to the tool position sensor 122. If communications between the IMU-based sensors 120 and the controller 140 occur, such communication may be accomplished via wireless communication (e.g., short range wireless communication techniques including Bluetooth, WiFi, Zigbee, and/or the like).

The controller 140 may also be in communication with the tool distance sensor 132. In this regard, for example, the tool distance sensor 132 may be configured to interface with the distance sensors 130 to make distance measurements. The tool distance sensor 132 may then communicate with the controller 140 to provide the distance measurements either on a continuous, periodic or event-driven basis. At one end of the spectrum, continuous distance measurements may be provided to and evaluated by the controller 140 at routine and frequent intervals. At the other end of the spectrum, the distance measurements may only be provided when the distance measured is below a threshold (e.g., minimum) distance. In any case, the controller 140 may be configured to evaluate the distance measurements relative to initiation of warnings or other protective features that the controller 140 may be configured to control. As an example, a chain brake 170 of the chainsaw 100 could be activated if the distance measured for any one of the distance sensors 130 relative to the tool distance sensor 132 is below the threshold distance. Alternatively or additionally, a warning may be provided (e.g., audibly, visually, or via haptic feedback). If hearing protection 180 is worn by the operator 110, an audible warning could be provided via the hearing protection 180. In some cases, the warning may be provided at a first (and larger distance) threshold being met, and the chain brake 170 could be activated for a second (and smaller distance) threshold being met.

The same or a different protection paradigm could also be initiated based on tracking done using the IMU-based sensors 120 and the tool position sensor 122. Thus, for example, the controller 140 may be configured to evaluate inputs received from either (or both) of the IMU-based sensors 120 and the tool position sensor 122, and the distance sensors 130 and the tool distance sensor 132. The evaluations may be performed simultaneously or in sequence to result in a fusion of the motion tracking and distance measurement sensors (and functions). However, it should also be appreciated that separate controllers (e.g., separate instances of the controller 140) may be employed for each respective one of the sets of wearable sensors in some examples. Moreover, as will be discussed in greater detail below, the controller 140 may be configured to prioritize usage of one or the other of motion tracking (e.g., via the IMU-based sensors 120 and the tool position sensor 122) and distance measurement (e.g., via the distance sensors 130 and the tool distance sensor 132) in specific contexts. For example, distance measurement related measures may have preference (or take precedence) within a certain range of distances (e.g., short distances), and motion tracking related measures may have preference (or take precedence) within another range of distances (e.g., at larger distances). The controller 140 may also be configured to manage calibration of the motion tracking functions of the IMU-based sensors 120 and the tool position sensor 122.

Figure 2:
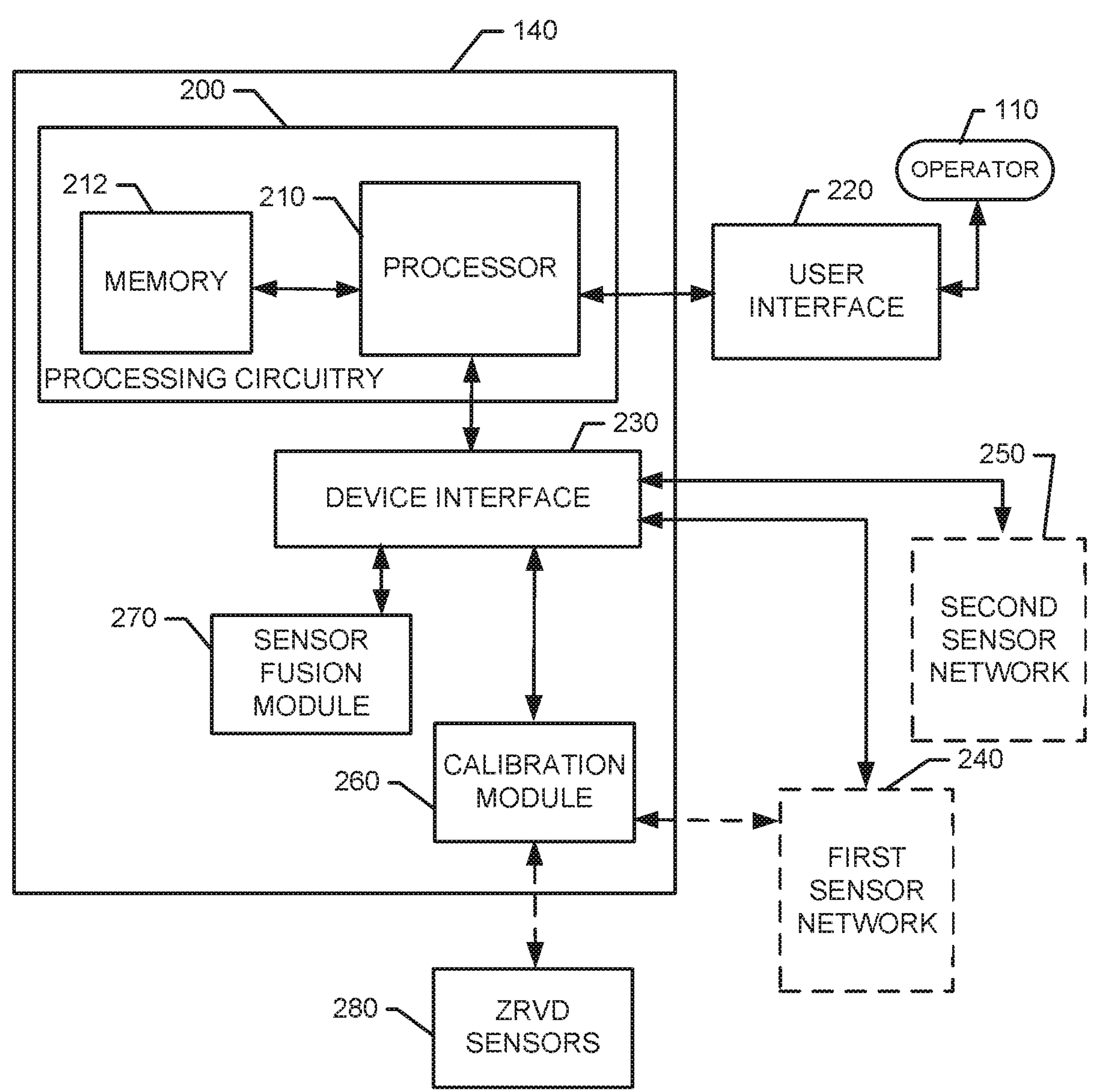
FIG. 2 illustrates a block diagram of a system for providing operator protection in accordance with an example embodiment.

The configuration of the controller 140 for performing sensor fusion and/or calibration in accordance with an example embodiment will now be described in reference to FIG. 2. In this regard, FIG. 2 shows a block diagram of the controller 140 in accordance with an example embodiment. As shown in FIG. 2, the controller 140 may include processing circuitry 200 of an example embodiment as described herein. The processing circuitry 200 may be configured to provide electronic control inputs to one or more functional units of the chainsaw 100 (e.g., the chain brake 170) or the system (e.g., issuing a warning to the hearing protection 180) and to process data received at or generated by the one or more of the motion tracking and distance measurement devices regarding various indications of movement or distance between the tool and the operator 110. Thus, the processing circuitry 200 may be configured to perform data processing, control function execution and/or other processing and management services according to an example embodiment.

In some embodiments, the processing circuitry 200 may be embodied as a chip or chip set. In other words, the processing circuitry 200 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 200 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 200 may include one or more instances of a processor 210 and memory 212 that may be in communication with or otherwise control other components or modules that interface with the processing circuitry 200. As such, the processing circuitry 200 may be embodied as a circuit chip (e.g., an integrated circuit chip) configured (e.g., with hardware, software or a combination of hardware and software) to perform operations described herein. In some embodiments, the processing circuitry 200 may be embodied as a portion of an onboard computer housed in the housing 150 of the chainsaw 100 to control operation of the system relative to interaction with other motion tracking and/or distance measurement devices.

Although not required, some embodiments of the controller 140 may employ or be in communication with a user interface 220. The user interface 220 may be in communication with the processing circuitry 200 to receive an indication of a user input at the user interface 220 and/or to provide an audible, visual, tactile or other output to the operator 110. As such, the user interface 220 may include, for example, a display, one or more switches, lights, buttons or keys, speaker, and/or other input/output mechanisms. In an example embodiment, the user interface 220 may include the hearing protection 180 of FIG. 1, or one or a plurality of colored lights to indicate status or other relatively basic information. However, more complex interface mechanisms could be provided in some cases.

The controller 140 may employ or utilize components or circuitry that acts as a device interface 230. The device interface 230 may include one or more interface mechanisms for enabling communication with other devices (e.g., the tool position sensor 122, the tool distance sensor 132, the chain brake 170, the hearing protection 180, the IMU-based sensors 120, and/or the distance sensors 130). In some cases, the device interface 230 may be any means such as a device or circuitry embodied in either hardware, or a combination of hardware and software that is configured to receive and/or transmit data from/to components in communication with the processing circuitry 200 via internal communication systems of the chainsaw 100 and/or via wireless communication equipment (e.g., a one way or two way radio). As such, the device interface 230 may include an antenna and radio equipment for conducting Bluetooth, WiFi, or other short range communication, or include wired communication links for employing the communications necessary to support the functions described herein.

In FIG. 2, the tool position sensor 122 and/or the IMU-based sensors 120 may be part of or embodied as a first sensor network 240, and the tool distance sensor 132 and/or the distance sensors 130 may be part of or embodied as a second sensor network 250. Thus, the first and second sensor networks 240 and 250 may be in communication with the controller 140 via the device interface 230. However, other direct or other indirect connection or communication mechanisms could be provided in some cases.

The processor 210 may be embodied in a number of different ways. For example, the processor 210 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 210 may be configured to execute instructions stored in the memory 212 or otherwise accessible to the processor 210. As such, whether configured by hardware or by a combination of hardware and software, the processor 210 may represent an entity (e.g., physically embodied in circuitry—in the form of processing circuitry 200) capable of performing operations according to embodiments of the present invention while configured accordingly. Thus, for example, when the processor 210 is embodied as an ASIC, FPGA or the like, the processor 210 may be specifically configured hardware for conducting the operations described herein. Alternatively, as another example, when the processor 210 is embodied as an executor of software instructions, the instructions may specifically configure the processor 210 to perform the operations described herein.

In an example embodiment, the processor 210 (or the processing circuitry 200) may be embodied as, include or otherwise control the operation of the controller 140 based on inputs received by the processing circuitry 200. As such, in some embodiments, the processor 210 (or the processing circuitry 200) may be said to cause each of the operations described in connection with a calibration module 260 and a sensor fusion module 270 relative to undertaking the corresponding functionalities associated therewith responsive to execution of instructions or algorithms configuring the processor 210 (or processing circuitry 200) accordingly.

In an exemplary embodiment, the memory 212 may include one or more non-transitory memory devices such as, for example, volatile and/or non-volatile memory that may be either fixed or re-movable. The memory 212 may be configured to store information, data, applications, instructions or the like for enabling the processing circuitry 200 to carry out various functions in accordance with exemplary embodiments of the present invention. For example, the memory 212 could be configured to buffer input data for processing by the processor 210. Additionally or alternatively, the memory 212 could be configured to store instructions for execution by the processor 210. As yet another alternative or additional capability, the memory 212 may include one or more databases that may store a variety of data sets. Among the contents of the memory 212, applications may be stored for execution by the processor 210 in order to carry out the functionality associated with each respective application. In some cases, the applications may include instructions for motion tracking and distance measurement as described herein, along with calibration and sensor fusion functions.

Calibration functions may be performed by the calibration module 260. In this example, the calibration may only be applicable to the first sensor network 240 (i.e., motion tracking). However, calibration of other functions could also or alternatively or additionally be performed. The calibration module 260 may be configured to interface with zero relative velocity detection (ZRVD) sensors 280 (either directly or via the device interface 230) disposed on the chainsaw 100 to facilitate calibration of the motion tracking devices (i.e., the IMU-based sensors 120 and the tool position sensor 122). In this regard, the ZRVD sensors 280 may include tactile sensors located in the handles (e.g., front handle and rear handle) of the chainsaw 100, accelerometer and/or magnetometer inputs from the chainsaw 100 (e.g., associated with the tool position sensor 122) and a sensor on the trigger of the chainsaw 100. Input from the ZRVD sensors 280 may be integrated with input from the IMU-based sensors 120, and used to calibrate a motion tracking algorithm employed by the controller 140. In this regard, for example, the calibration process may include resetting velocity and displacement errors that are introduced, and may build up over time, from the IMU-based sensors 120.

In an example embodiment, the ZRVD sensors 280 may be used to define (or learn) one or more specific tool and/or body positions (or combinations thereof) that correlate to calibration positions. In this regard, for example, certain positions may have known sensor data associated therewith. Accordingly, the chainsaw 100 may be detected as being held in one or more of such positions during a calibration procedure in order to reset to a known state of parts of the sensor data. Given that there may be multiple positions, various different parts of the sensor data may be reset until a full reset is achieved by going through a full sequence of calibration positions.

Accordingly, the user manual or a maintenance manual for the chainsaw 100 may list the calibration positions. A calibration mode may be entered, and the corresponding positions may be sequentially cycled through. The calibrated positions may relate to both the chainsaw 100 and the operator 110 in some cases. Thus, for example, the operator 110 (who may be a maintenance technician, or the owner in various cases) may be guided as to the poses to assume with the chainsaw 100 while wearing the IMU-based sensors 120. The positions may also or alternatively be sensed by the tactile sensors that may be part of the ZRVD sensors 280. Thus, for example, the ZRVD sensors 280 may detect that the operator 110 has maneuvered the chainsaw 100 to one of the calibration positions based on how the operator 110 is holding the chainsaw 100, and/or based on the pressing of the trigger and correlated accelerometer and/or magnetometer readings in order to determine vertical or horizontal orientation of the chainsaw 100. In some cases, the inclusion of multiple ones of the IMU-based sensors 120 and sensors on the chainsaw 100 (e.g., the ZRVD sensors 280) may ensure sufficient independence to achieve good results. Thus, given that the chainsaw 100 may be detected to be in various positions, the calibration can automatically occur when one of the calibrated positions is detected (i.e., not responsive to a guided pose, but during use and responsive to detecting that a pose has been assumed with the chainsaw 100). Detection of position (and specifically of calibration positions) may occur when the operator 110 pulls the trigger (or actuates another button or operative member of the chainsaw 100). In some cases, the tactile pressure sensor in the handles of the chainsaw 100 (as determined by ZRVD sensors 280) may be used to determine a position of the hands relative to determining a current pose of the operator 110 and/or position of the chainsaw 100.

In some cases, the calibration procedure may be a part of routine maintenance with a prescribed periodicity. However, the calibration procedure can also or alternatively occur automatically when a calibrated position is detected (either every time, or if calibration in the corresponding calibrated position has not been performed within a given threshold period of time). The calibration algorithm may be configured to perform a double integration of acceleration for linear displacement, gyro data for direction, and Kalman filtering for improved prediction of motion tracking by error correction.

Figure 3:
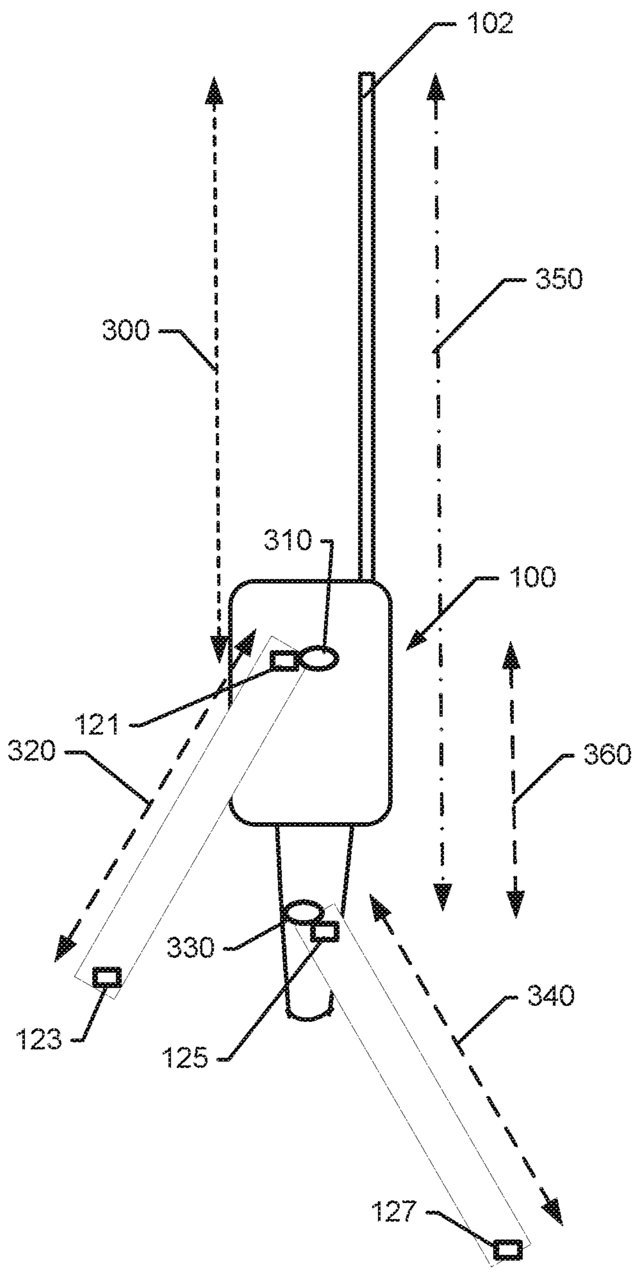
FIG. 3 illustrates a schematic diagram showing how known distances in prescribed poses may be used for calibration of sensors in accordance with an example embodiment.

FIG. 3 illustrates a schematic view of a calibration position of an example embodiment. As shown in FIG. 3, the chainsaw 100 may be detected as being held in a particular pose by an operator with the IMU-based sensors 120 at known locations (based on the particular pose). In some cases, the IMU-based sensors 120 may be affixed at (e.g., mounted within) fixed or known locations on PPE such as a jacket or legwear. In this example, the IMU-based sensors 120 include a left glove sensor 121 and a left elbow sensor 123, a right glove sensor 125 and a right elbow sensor 127. However, it should be appreciated that other sensors at other locations could also be included. Thus, the locations and specific sensors shown are merely provided to facilitate explanation of an example embodiment, and are not intended to limit example embodiments.

As can be appreciated from FIG. 3, a distance 300 from the end of the bar of the chainsaw 100 to the left glove sensor 121, which would be known to be on the front handle of the chainsaw 100 may be known. As mentioned above, one or more tactile sensors 310 (e.g., as part of the ZRVD sensors 280) may be disposed on the front handle to confirm the specific location of the left hand of the operator (and/or the left glove sensor 121). The distance 320 from the left glove sensor 121 to the left elbow sensor 123 may also be known, particularly for the designated pose. Similarly, one or more tactile sensors 330 (again examples of the ZRVD sensors 280) may be disposed at the rear handle of the chainsaw 100. The tactile sensors 330 may confirm the specific location of the right hand of the operator (and/or the right glove sensor 125). Meanwhile, the distance 340 from the right glove sensor 125 to the right elbow sensor 127 may also be known, particularly for the designated pose. A distance 350 from the end of the bar of the chainsaw 100 to the right glove sensor 125, and a distance 360 between the tactile sensors 310 and 330, may also be known. Accordingly, with the known distances (300, 320, 340, 350 and 360), and stored baseline data associated with the pose, the IMU-based sensors 120 can be calibrated.

Figure 4:
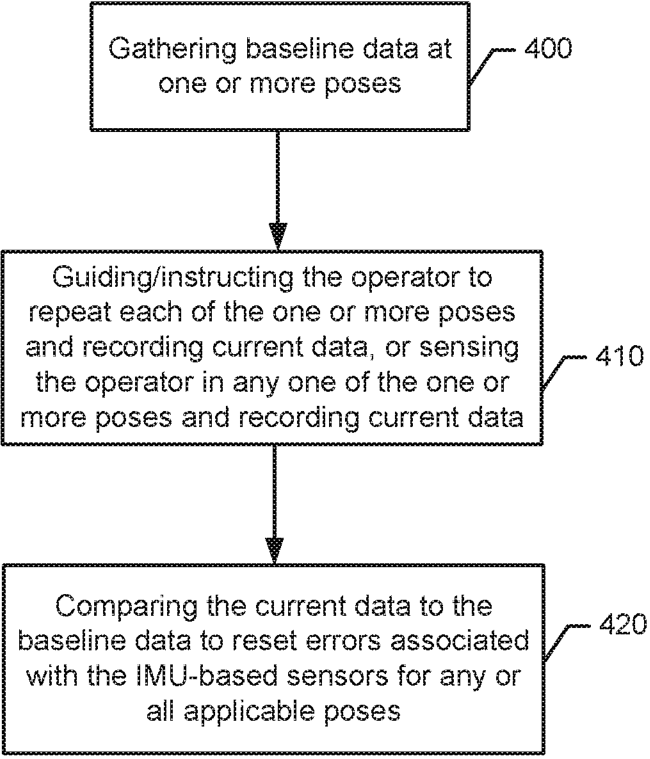
FIG. 4 illustrates a block diagram of a method of calibrating sensors in accordance with an example embodiment.

FIG. 4 is a block diagram of a calibration method in accordance with an example embodiment. As shown in FIG. 4, baseline data may be gathered for one or more poses at operation 400. The baseline data may include information associated with roll, pitch, yaw, and other variables of interest including acceleration and velocity information for poses that include motion. At operation 410, the operator 110 may be guided through each of the one or more poses in order to obtain current data for comparison to the baseline data or the operator 110 may be sensed/detected in any of the one or more poses. Thereafter, at operation 420, the controller 140 may reset errors associated with the IMU-based sensors 120 based on the comparison, for any or all applicable poses.

As noted above, in some cases, the variables defined may vary (e.g., X/Y/Z, roll/pitch/yaw, Euler, Quaternions, etc.) depending on the specific implementation. Other variables may include device state, and/or a global data-structure variable including acceleration, velocity, angular velocity, position, gyro readings, etc., that can be used for sensor fusion (e.g., by the sensor fusion module 270). Based on the distances mentioned above, various local variables such as the calculated displacement (CalcDis), calculated orientation (CalcOri), and calculated velocity (CalcVel) may be measured or determined. For an example calculation for calibrated motion tracking, the following calculations could serve as one example program, which could be employed.

```
State := Init( ) //Initiation, measured position matrix based on known hand positions on handles
combined with accelerometer and magnetometer readings for orientation, reinforced with
machine learning (ML)-based training set data, and for init state in adviced position//
Loop While (On)
    Calculate( )
Function Calculate( ) (
MeasUpdate(State) //Similar to Init but measurement that is context adapted, i.e., bias parameters
continuously updated in each step//
//Calculations below use updated parameters from the MeasUpdate step//
CalcVel := ∫(Acceleration) //Calculated Velocity//
CalcDis := Initial displacement + ∫(CalcVel) //Calculated displacement//
CalcOri := Initial orientation + ∫(Angular velocity) //Calculated orientation//
Est := Update(CalcDis, CalcOri) //Continuously calculated State//
)
Function MeasUpdate ( ) (
Complex function that implements update bias parameters for state, action and observation data
(e.g., Kalman filter theory)
)
```

The sensor fusion module 270 may be configured to fuse data received by the motion tracking devices (e.g., the IMU-based sensors 120 and the tool position sensor 122) and by the distance measurement devices (e.g., the distance sensors 130 and the tool distance sensor 132). The data received from the motion tracking devices may be received at the controller 140 and processed to determine motion tracking information. The motion tracking information may then be provided to the sensor fusion module 270. As such, when calibrated, the motion tracking information from the motion tracking devices may be considered to be ZRVD-calibrated IMU motion tracking information.

The data received from the distance measurement devices may also be received at the controller 140 (either the same or a different instance of the controller 140) and processed to determine distance measurement information. As noted below in reference to the descriptions of FIGS. 5 and 6, the processing for determining the distance measurement information could take a number of different forms. Regardless of the form, the distance measurement information may then also be provided to the sensor fusion module 270. The sensor fusion module 270 may be configured to process the distance measurement information and the motion tracking information based on a set of fusion rules. The fusion rules may be generated based on an understanding that the distance measurement information may be more accurate for close range distances, and the motion tracking information may be most useful for tracking motion when the chainsaw bar is relatively far from any body parts. Thus, the fusion rules may define a hierarchy of priority for the distance measurement information and motion tracking information based on proximity. For example, when a movement toward a body part is detected, as distance decreases, the distance measurement information will have increased authority, and as distance increases, the motion tracking information will have increased authority in relation to determining protective functions (if any).

Figure 5:
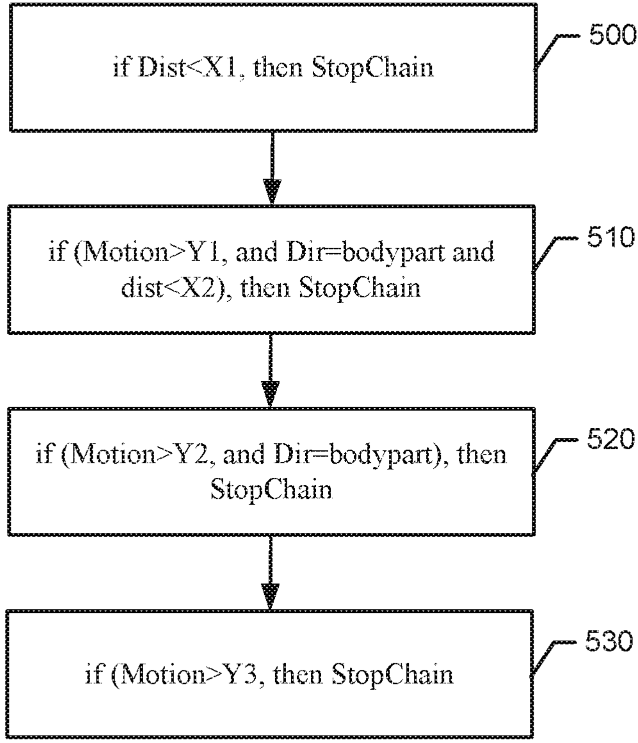
FIG. 5 is a block diagram of a set of rules that may be applied to balance application of two different sets of sensors in accordance with an example embodiment.

FIG. 5 is a block diagram showing an example of fusion rules that may be applied in accordance with an example embodiment. Within the context of FIG. 5, the following term definitions apply:

Dist: Distance between chain 102 and a body part;

Motion: Motion of the chainsaw bar (e.g., aggregated based on accelerometer and gyro input); and Dir: Direction of motion of the chainsaw bar based on a calculated state.

Within this context, a first rule 500 may be defined for the minimum distance allowed for a stationary bar. According to the first rule 500, if Dist<X1, then StopChain. In other words, if the bar is closer than a minimum distance (X1), then the chain 102 should be stopped. A second rule 510 may be defined for the minimal distance allowed during high velocity motion. According to the second rule 510, if (Motion>Y1, and Dir=bodypart and dist<X2), then StopChain. In other words, if the bar is in motion above a certain velocity (Y1) and the distance to a body part is less than a minimal distance (X2) when motion toward any sensor is detected, then the chain 102 should be stopped. A third rule 520 may be defined for the maximum allowed motion velocity regardless of distance. According to the third rule 520, if (Motion>Y2, and Dir=bodypart), then StopChain. In other words, if the bar is in motion above a certain velocity (Y2) when motion toward any body part is detected, then the chain 102 should be stopped no matter what the current distance happens to be. A fourth rule 530 may be defined for the maximum allowed motion velocity regardless of direction. According to the fourth rule 530, if (Motion>Y3), then StopChain. In other words, if the bar is in motion above a certain velocity (Y3), then the chain 102 should be stopped no matter what the current distance happens to be, and no matter what the direction of movement of the bar is. This is just one example of a rule set that can be employed As noted above, distance measurement information can take multiple forms based on the specific sensors and technologies used to implement the distance measurement devices. In an example embodiment, reader based measurement may be employed in some cases. For example, the tool distance sensor 132 may be embodied as an electromagnetic reader (or transponder) that is mounted on the tool (e.g., proximate to the working assembly, or in this case, the chain 102 of the chainsaw 100, such as on the guide bar), and may include a main lobe that covers the entire surroundings of the working assembly of the tool (e.g., guide bar and chain 102). The electromagnetic reader may be configured to sense a device (e.g., an electronic tag) using a back-scattering principle. A radio frequency identification (RFID) tag is an example of such a tag. However, the tag could also be active in some cases. In any case, FIG. 6 illustrates an example reader 600 with an electronic tag 610 to facilitate further description of such an example.

Figure 6:
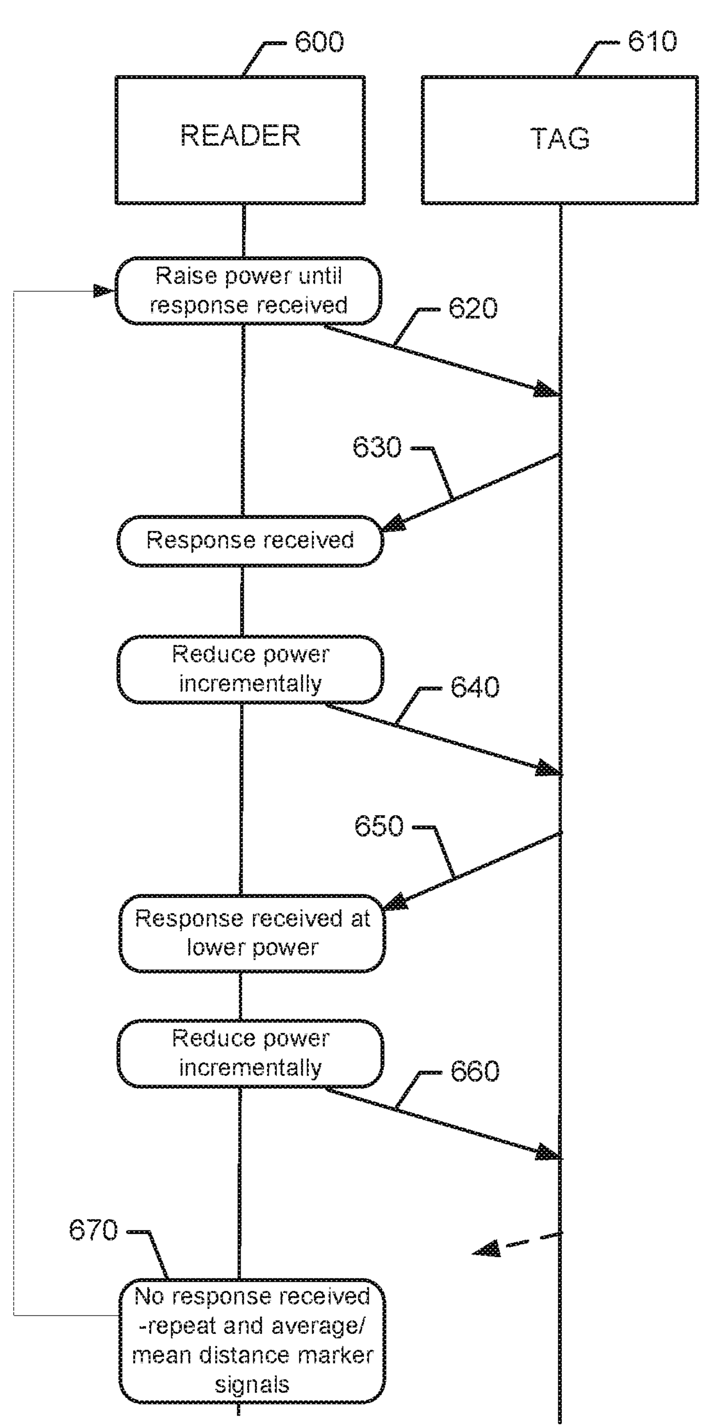
FIG. 6 illustrates a control flow diagram for a scenario involving detection of a distance between a reader and an electronic tags in accordance with an example embodiment.

Referring to FIG. 6, the reader 600 may utilize power provided by the chainsaw 100 to execute an adaptive transmission power algorithm as part of a range determination process. The adaptive transmission power algorithm may include generating an initial detection signal 620 for transmission with a modulated code over a carrier wave by raising transmit power until a detection occurs. When the tag 610 is within a prescribed distance from the reader 600, and the power level is sufficient, the tag 610 will receive sufficient power from the initial detection signal 620 transmitted to generate a response 630 that is then detected by the reader 600. The response 630 will retransmit a code used as an identifier for the tag 610 back to the transponder 600 to identify the tag 610. Having detected the tag 610, the transponder 600 may then reduce the transmit power from the transponder 600 to transmit a power reduced signal 640 having an incrementally lower value than the initial detection signal 620. If received with sufficient power, the tag 610 will send a power reduced response 650. The reader 600 will then reduce power again (e.g., incrementally) and repeat the incremental power reductions until no response is received from the tag 610. The signal associated with the last (i.e., lowest) power transmitted, when the tag 610 is no longer detected, may be referred to as a distance marker signal 660. When the power of the distance marker signal 660 is determined, it can be seen that this power is proportional to distance in a fairly consistent and accurate way.

In this regard, detection range is generally exponentially proportional to the output power or transmit power of the reader 600. Although the specific values may change from antenna to antenna (e.g., reader to reader), the proportionality is fairly consistent. Thus, an accurate mapping of power to detection range may be achieved, and small calibration adjustments may be made for individual antennas. Other correction factors (e.g., for temperature) may also be applicable in some cases. The mappings may be stored in the memory 212, and accessible to the controller 140 for determining the distance measurement information. Accordingly, when the distance marker signal 660 is determined, the process above can be repeated (as shown by operation 670) to determine additional instances of the distance marker signal 660. Any desirable number of repeated iterations can be completed, and a convergence around a range of powers at which the tag 610 is lost may be determined. For example, an average or mean power for distance marker signals may be computed with each, or with a predetermined number of iterations of operation 670. The average or mean power for the distance marker signals may then be correlated to the mapping stored in the memory to determine a range or distance between the corresponding sensor (i.e., the tag 610) and the reader 600. This process can be repeated and cycled through rapidly for each one of the distance sensors 130 using a time division scheme.

An example of pseudocode that may be used for simplified range detection is shown below in which context the following term definitions apply:

```
INT POW := 0 //Output power variable//
INT A := 5 //Output power increment//
BOOL SENSE := False // Tag sensing variable continuously updated
INT RANGE := 500 //Range variable
Loop
(
SENSE := Update( ) //Sensing function//
If SENSE=False
  POW := POW + A
```

-continued

```
Else
  POW := POW − A
  RANGE := MAP //Maps power to range from table or transfer func-
tion//
)
```

As an alternative to using the reader 600 and tag 610 paradigm described above, time of flight-based measurements may be used in some cases. In this regard, the distance measurement information may be calculated from the time of flight of a transmitted signal if the velocity of the signal is known. For electromagnetic signals (e.g., laser, infrared, radio-frequency), the velocity is known to be the speed of light. In an example in which the tool distance sensor 132 is embodied as a laser or infrared light source, the tool distance sensor 132 generally transmits the laser or infrared light and then measures the time it takes to receive a reflection from one (or multiples ones) of the distance sensors 130. For sound or audible signals, the velocity is known to be the speed of sound, and the distance sensors 130 may be transmitters so that the tool distance sensor 132 only measures a one way time of flight. In some cases, to avoid complications associated with the potential for dirt or other objects to block or foul sensors, radio transceivers may be preferred. In such examples, turnaround time (i.e., a two-way time of flight) can be measured by the tool distance sensor 132 (acting as a master transceiver).

In any case, when applied over short distances, which is generally the case for the context in which example embodiments operate, time of flight will be in the range of a few nanoseconds for light and radio waves, and therefore requires a relatively high sampling rate in order to achieve good accuracy. As such, some embodiments may employ ultrasound transmitters and receivers (i.e., active, and not passive, ultrasound) since sound travels much slower. The slower wave travel may allow lower sampling frequencies to be employed while still achieving good accuracy.

As yet another alternative for obtaining the distance measurement information, radar based measurements may be employed. In this regard, for example, millimeter wave radar may be employed to provide resistance to both dirt and moisture, along with good accuracy within ranges of 0 to 500 mm (which are common in this context). Millimeter wave radar is also relatively fast, and lenses can be added to control radar beams. Advanced signal processing techniques can also be employed to distinguish different objects from each other. In such an example, the tool distance sensor 132 may be embodied as a millimeter wave radar sensor configured to detect the distance sensors 130 based on returns received responsive to each transmission.

Accordingly, in one example embodiment, a system for protecting an operator of a power tool may be provided. The system may include a first set of wearable sensors worn by the operator, a second set of wearable sensors worn by the operator, a first tool sensor disposed at the power tool where the first tool sensor is configured to communicate with the first set of wearable sensors, a second tool sensor disposed at the power tool where the second tool sensor is configured to communicate with the second set of wearable sensors, and a controller. The controller may be configured to determine, based on distances between the first tool sensor and the first set of wearable sensors and between the second tool sensor and the second set of wearable sensors, whether to initiate a protective action with respect to the power tool.

In some cases, modifications or amplifications may further be employed as optional alterations or augmentations to the description above. These alterations or augmentations may be performed exclusive of one another or in any combination with each other. In some cases, such modifications or amplifications may include (1), the power tool may be a chainsaw, and the protective action may be activating a chain brake of the chainsaw when one of the first set of wearable sensors or the second set of wearable sensors is within a threshold distance of a respective one of the first tool sensor or the second tool sensor. In an example embodiment (2), the power tool may be a chainsaw or other power equipment such as power cutters with a blade or chain, and the protective action may be providing an audible or visual warning to the operator when one of the first set of wearable sensors or the second set of wearable sensors is within a threshold distance of a respective one of the first tool sensor of the second tool sensor. In some cases (3), the first set of wearable sensors may include a plurality of inertial measurement unit (IMU)-based sensors, and the first tool sensor may be a tool position sensor. In such an example, the second set of wearable sensors may include a plurality of distance sensors, and the second tool sensor may be a reader disposed at the power tool. In some embodiments (4), the IMU-based sensors and the tool position sensor may be periodically calibrated based on predefined poses of the operator and corresponding positions of the power tool. In an example embodiment (5), the controller may be configured to store baseline data corresponding to known distances from each of the IMU-based sensors to the tool position sensor in each of the predefined poses. In such an example, the controller may be configured to perform a comparison of the baseline data to current data gathered in the predefined poses, and reset errors associated with the IMU-based sensors based on the comparison. In some embodiments (6), the controller may be configured to obtain distance information from the plurality of distance sensors and the reader, and to obtain motion tracking information from the IMU-based sensors and the tool position sensor. In such an example, the controller may be configured to prioritize the distance information over the motion tracking information within a predefined distance, and prioritize the motion tracking information over the distance information outside the predefined distance. In some cases (7), the transponder may be a millimeter wave radar sensor with focus lenses for the beam. In an example embodiment (8), the reader may be a light or ultrasound transmitter, and the controller may be configured to calculate distance information based on time of flight measurements associated with the reader and the plurality of distance sensors. In some cases (9), the reader may be an electromagnetic reader configured to detect electronic tags, and each of the plurality of distance sensors may be an electronic tag. In some embodiments (10), the controller may configured to: a) increase transmit power until an instance of the electronic tag is detected, b) reduce power until the instance of the electronic tag is no longer detected, c) repeat steps a) and b) to determine a mean or average power at which the electronic tag is no longer detected, and d) determine a range between the reader and the instance of the electronic tag based on the mean or average power.

In an example embodiment, some, any or all of modifications/amplifications (1) to (10) may be employed in any combination with each other. Moreover, in some cases, the system could just include either the first set of wearable sensors, where the sensors are configured to be calibrated (e.g., as in (4) and (5) above). In some cases, the system may just include the second set of wearable sensors, where the sensors are configured as in (10) above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A system for protecting an operator, the system comprising:

a power tool configured to be held by the operator;

a first set of wearable sensors configured to be worn by the operator;

a second set of wearable sensors configured to be worn by the operator;

a first tool sensor disposed at the power tool, the first tool sensor being configured to communicate with the first set of wearable sensors to determine motion tracking information;

a second tool sensor disposed at the power tool, the second tool sensor being configured to communicate with the second set of wearable sensors to determine distance information; and a controller configured to determine, based on the motion tacking information and the distance information, whether to initiate a protective action with respect to the power tool, wherein the motion tracking information provides high precision tracking of motion via directly inferred linear acceleration and angular velocity data in three dimensions at the operator, wherein the controller is configured to prioritize the distance information over the motion tracking information within a predefined distance from the operator to the power tool represented by distance information between the second set of wearable sensors and the second tool sensor, and prioritize the motion tracking information over the distance information outside the predefined distance, and wherein the predefined distance is only measured using the distance information measured using the second tool sensor and the second set of wearable sensors.

2. The system of claim 1, wherein the power tool is a chainsaw or other power equipment such as power cutters with blade or chain, and wherein the protective action comprises activating a chain brake of the chainsaw when one of the first set of wearable sensors or the second set of wearable sensors is within a threshold distance of a respective one of the first tool sensor or the second tool sensor, or when velocity of the power tool relative to the operator's body is above a threshold velocity, or when acceleration of the power tool relative to the operator's body is above a threshold acceleration.

3. The system of claim 1, wherein the power tool is a chainsaw or other power equipment such as power cutters with blade or chain, and wherein the protective action comprises providing an audible or visual warning to the operator when one of the first set of wearable sensors or the second set of wearable sensors is within a threshold distance of a respective one of the first tool sensor.

4. The system of claim 1, wherein the first set of wearable sensors comprises a plurality of inertial measurement unit (IMU)-based sensors, and the first tool sensor comprises tool position sensor, and wherein the second set of wearable sensors comprises a plurality of distance sensors, and the second tool sensor comprises a reader disposed at the power tool.

5. The system of claim 4, wherein the IMU-based sensors and the tool position sensor are periodically calibrated based on predefined poses of the operator and corresponding positions of the power tool.

6. The system of claim 5, wherein the controller stores baseline data corresponding to known distances from each of the IMU-based sensors to the tool position sensor in each of the predefined poses, wherein the controller is configured to perform a comparison of the baseline data to current data gathered in the predefined poses, and wherein the controller is configured to reset errors associated with the IMU-based sensors based on the comparison.

7. The system of claim 4, wherein the controller is configured to obtain distance information from the plurality of distance sensors and the reader, and to obtain motion tracking information from the IMU-based sensors and the tool position sensor, and wherein the controller is configured to prioritize the distance information over the motion tracking information within a predefined distance, and prioritize the motion tracking information over the distance information outside the predefined distance.

8. The system of claim 4, wherein the reader is a millimeter wave radar sensor with or without radar beam lenses.

9. The system of claim 4, wherein the reader is a radio, light or ultrasound transmitter, and wherein the controller is configured to calculate distance information based on time of flight measurements associated with the reader and the plurality of distance sensors.

10. The system of claim 4, wherein the reader is an electromagnetic radio reader configured to detect electronic tags, and wherein each of the plurality of distance sensors is an electronic tag.

11. The system of claim 10, wherein the controller is configured to:

a) increase transmit power until an instance of the electronic tag is detected;

b) reduce power until the instance of the electronic tag is no longer detected;

c) repeat steps a) and b) to determine a mean or average power at which the electronic tag is no longer detected; and d) determine a range between the reader and the instance of the electronic tag based on the mean or average power.

12. A system for protecting an operator, the system comprising:

a power tool configured to be held by the operator, wherein the power tool is a chainsaw or other power equipment such as power cutters with blade or chain;

a plurality of inertial measurement unit (IMU)-based sensors configured to be worn by the operator;

a plurality of distance sensors also worn by the operator;

a reader disposed at the power tool;

a tool position sensor disposed at the power tool; and a controller configured to determine, based on measurements between the IMU-based sensors and the tool position sensor, whether to initiate a protective action with respect to the power tool, wherein the IMU-based sensors and the tool position sensor are periodically calibrated based on predefined poses of the operator and corresponding positions of the power tool, wherein the controller is configured to obtain distance information from the plurality of distance sensors and the reader, and to obtain motion tracking information from the IMU-based sensors and the tool position sensor, wherein the motion tracking information provides high precision tracking of motion via directly inferred linear acceleration and angular velocity data in three dimensions, wherein the controller is configured to prioritize the distance information over the motion tracking information within a predefined distance from the operator represented by the distance sensors to the power tool represented by the reader, and prioritize the motion tracking information over the distance information outside the predefined distance, and wherein the predefined distance is only measured using the distance information measured between the plurality of distance sensors and the reader.

13. The system of claim 12, wherein the controller stores baseline data corresponding to known distances from each of the IMU-based sensors to the tool position sensor in each of the predefined poses, wherein the controller is configured to perform a comparison of the baseline data to current data gathered in the predefined poses, and wherein the controller is configured to reset errors associated with the IMU-based sensors based on the comparison.

14. The system of claim 13, further comprising a plurality of distance sensors also worn by the operator, and a reader disposed at the power tool.

15. The system of claim 14, wherein the controller is configured to obtain distance information from the plurality of distance sensors and the reader, and to obtain motion tracking information from the IMU-based sensors and the tool position sensor, and wherein the controller is configured to prioritize the distance information over the motion tracking information within a predefined distance, and prioritize the motion tracking information over the distance information outside the predefined distance.

16. The system of claim 12, wherein the power tool is a chainsaw or other power equipment such as power cutters with blade or chain, wherein the protective action comprises activating a chain brake of the chainsaw when one of the first set of wearable sensors or the second set of wearable sensors is within a threshold distance of a respective one of the first tool sensor of the second tool sensor, and/or wherein the protective action comprises providing an audible or visual warning to the operator when one of the first set of wearable sensors or the second set of wearable sensors is within the threshold distance of a respective one of the first tool sensor of the second tool sensor, or when velocity of the power tool relative to the operator's body is above a threshold velocity, or when acceleration of the power tool relative to the operator's body is above a threshold acceleration.

17. A system for protecting an operator, the system comprising:

a power tool configured to be held by the operator, wherein the power tool is a chainsaw or other power equipment such as power cutters with blade or chain;

a plurality of distance sensors configured to be worn by the operator;

a reader disposed at and powered by the power tool; and a controller configured to determine, based on distances between each of the distance sensors and the reader, whether to initiate a protective action with respect to the power tool, wherein the controller is configured to perform an adaptive power control cycle to determine the distances between each of the distance sensors and the reader, wherein the adaptive power control cycle comprises varying transmission signal power via incrementally lowering the transmission signal power from an initial detection signal of the reader to determine an average power at which each of the distance sensors is no longer detected by the reader disposed at the power tool to determine an operation range between the operator represented by the distance sensors and the power tool represented by the reader, wherein the initial detection signal is the transmission signal power at which the reader initially detects each of the distance sensors, and wherein the controller is configured to determine the distances based on a comparison of the average power with previous power mapping information stored at the controller.

18. The system of claim 17, wherein the distance sensors are each electronic tags, and wherein the adaptive power control cycle comprises:

a) increasing transmit power until an instance of the electronic tag is detected;

b) reduce power until the instance of the electronic tag is no longer detected;

c) repeat steps a) and b) to determine a mean or average power at which the electronic tag is no longer detected; and d) determine a range between the reader and the instance of the electronic tag based on the mean or average power.

19. The system of claim 18, wherein the power tool is a chainsaw or other power equipment such as power cutters with blade or chain, wherein the protective action comprises activating a chain brake of the chainsaw when one of the first set of wearable sensors or the second set of wearable sensors is within a threshold distance of a respective one of the first tool sensor or the second tool sensor or when velocity of the power tool relative to the operator's body is above a threshold velocity, or when acceleration of the power tool relative to the operator's body is above a threshold acceleration, and/or wherein the protective action comprises providing an audible or visual warning to the operator when one of the first set of wearable sensors or the second set of wearable sensors is within the threshold distance of a respective one of the first tool sensor or the second tool sensor.

20. The system of claim 18, further comprising a plurality of inertial measurement unit (IMU)-based sensors worn by the operator, and a tool position sensor disposed at the power tool, wherein the controller is configured to determine, based on measurements between the IMU-based sensors and the tool position sensor, whether to initiate the protective action with respect to the power tool.

* * * * *